May 22, 1928.

F. E. HAND

DISK HARROW 1,670,408

Original Filed July 5, 1924    2 Sheets-Sheet 1

Inventor
Frederick E. Hand,
By John L. Jackson,
Attorney

May 22, 1928.  
F. E. HAND  
DISK HARROW  
Original Filed July 5, 1924   2 Sheets-Sheet 2

1,670,408

Inventor.  
Frederick E. Hand,  
John L. Jarrow,  
Attorney

Patented May 22, 1928.

1,670,408

UNITED STATES PATENT OFFICE.

FREDERICK E. HAND, OF SYRACUSE, NEW YORK, ASSIGNOR TO DEERE & COMPANY, OF MOLINE, ILLINOIS, A CORPORATION OF ILLINOIS.

DISK HARROW.

Application filed July 5, 1924, Serial No. 724,506. Renewed October 29, 1927.

My invention relates to tandem disk harrows, or disk harrows comprising front and rear sections each composed of a pair of disk gangs so mounted that they may be turned into a position of alinement for transport purposes, which is their inoperative position, or may be turned into angular relation to each other, which is their operative position.

In harrows of the tandem type the rear section is drawn through the front section, with which the draft power, either a team or a tractor, is connected, and it has been largely the custom to connect the rear section flexibly with the front section so as to permit the front and rear units or sections to swing laterally relatively to each other for convenience in driving around trees or other obstacles, or in turning corners, as well as to permit vertical movement of either or both of the rear gangs relatively to the gangs of the front section, but a serious objection to flexibly connected tandem disk harrows as heretofore constructed is that they have not been equipped with adequate means for so controlling the position of the rear harrow section that each of the disks of the rear gangs will always work in the ridge left between the furrows turned by the pair of front disks behind which it is set, or, in other words, will not run into or across one of such furrows and thereby leave some portion of the ridge between them unturned. This relation of the disks of the rear gangs to those of the front gangs may appropriately be termed "registration", and the maintenance of registration in a disk harrow of the tandem flexibly connected type on straight-away work, and also when turns are made, so that the ridges left between the front disks will be properly cut at all times, and, in making turns, the rear gangs cannot by swinging in on the turn damage trees or strike obstacles that have been avoided by the front gangs, is a result which those skilled in the art have for many years sought to accomplish, but which prior to my present invention has never been realized in a practical way. Various expedients have been proposed for flexibly connecting together the front and rear harrow sections in such manner as to permit the disks of the rear section normally to maintain a position of registration on curves, such, for example, as the use of a pair of crossed links connected at their forward ends with the front section and at their rear ends with the rear section, in the same manner as such links are used in the running gear of vehicles to cause the rear wheels of the vehicle in rounding a curve to describe arcs concentric with those described by the front wheels, as will be more explicitly hereinafter pointed out, but all prior constructions of which I am aware have proved inoperative or unsuccessful for the intended purpose, because they have not been so designed as to use the power of the draft advantageously as a positive factor in maintaining registration under the varying operating conditions encountered in the operation of disk harrows. In the operation of flexibly connected tandem disk harrows the front section is steered, and held against any considerable oscillation about a vertical axis, by the draft power, but the rear section, being pivotally connected to the front section, in the absence of adequate controlling means is free to oscillate or swing laterally about a vertical axis independently of the front section when the disks of the opposite rear gangs encounter unequal resistance, which swinging shifts the disks from their normal registering position with relation to the disks of the front gangs. The condition of an unopposed tendency of the rear harrow section to so swing laterally, which may be termed "nervousness", is highly objectionable, as in order to properly perform their work the disks of the rear section should be held steady and maintain their registering position, and this is particularly desirable in turning, and also in side hill work, where a nervous harrow has a strong tendency to side-slip or "drift," and so get out of registration. Many constructions have heretofore been proposed to cure this nervousness and obtain stability, but while some of such attempts have been measurably successful so far as relieving nervousness on straight-away work is concerned, it has been done at the expense of flexibility, and of maintaining registration on curves, or on turns to avoid obstacles.

In my application for patent for improvements in disk harrows, filed of even date herewith, I have shown and described a flexible tandem disk harrow of such construction that the draft force operates as a positive factor in maintaining registration and overcoming nervousness by opposing oscillation or lateral swinging of the rear harrow section independently of the front section, and by directly aiding in the restoration of the rear section to its normal operative position when a straight-away course is resumed after a turning movement, and in said application that invention is claimed generically. This application has to do with the same general subject matter of invention, and it has for its object to provide a construction by which the same results can be obtained by somewhat different instrumentalities which possess certain advantages which will be hereinafter pointed out. What I regard as new is set forth in the claims.

In the accompanying drawings,—

Figure 1:
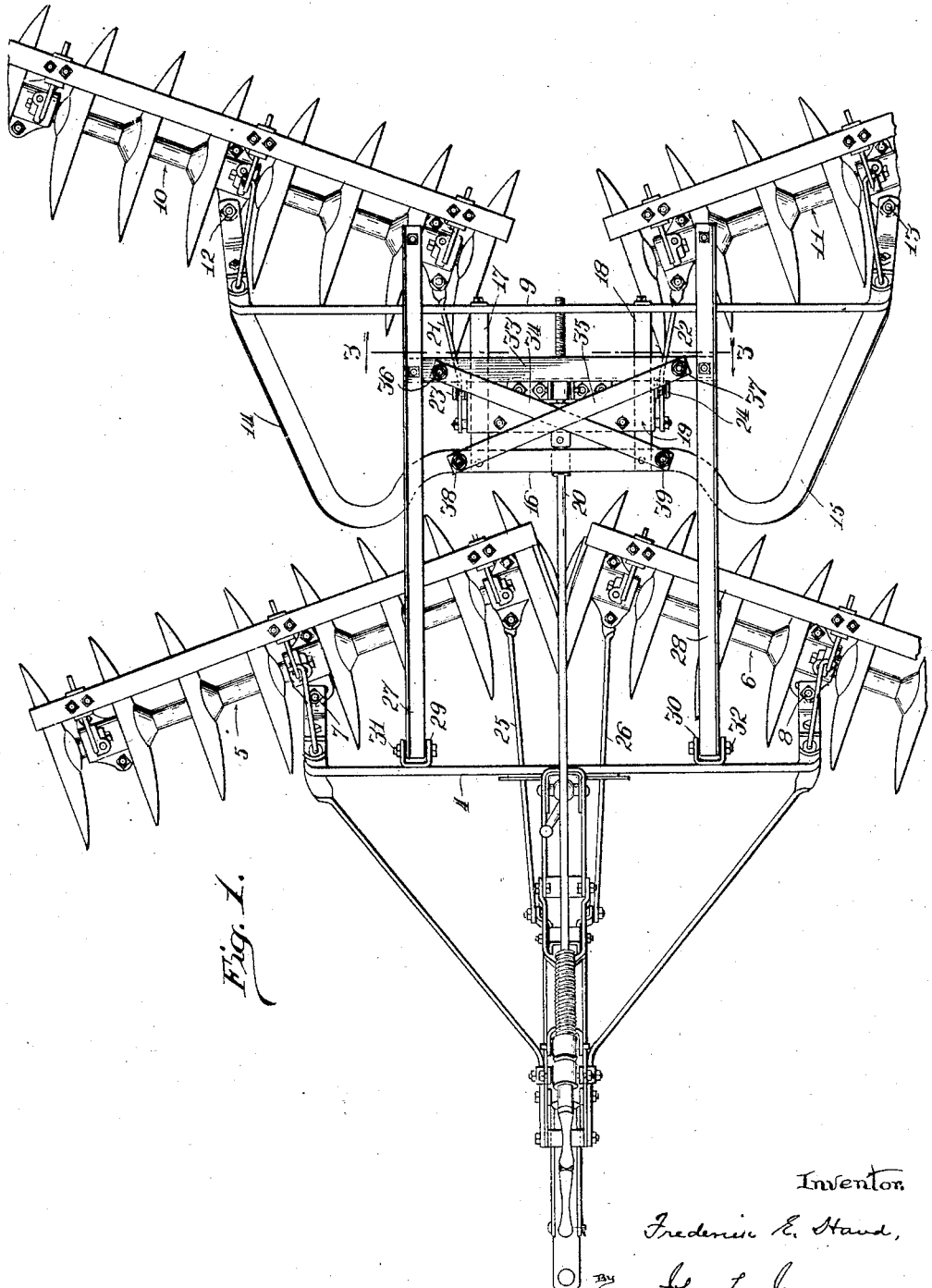
Fig. 1 is a plan view of the principal parts of a tandem disk harrow, some parts being broken away, and the front and rear sections being shown in their normal operative position, i. e., the position they occupy for straight-away work.

It will be understood that, aside from my improvements, the harrow shown in the drawings is merely illustrative of a class of harrows commercially well known, and I wish it to be understood that the improvements hereinafter described may be applied to any other tandem disk harrow to which they are adapted.

Referring to the drawings, the harrow therein illustrated comprises the usual front and rear units, each made up of a suitable frame, to which are attached pairs of disk gangs arranged to be swung about vertical axes so that the gangs of each pair may either be alined or be turned into angular relation to each other. In the illustrations 4 indicates a transverse beam which forms a part of the frame of the front harrow unit, and 5, 6 the front disk gangs, which are pivoted at 7, 8, respectively, to the end portions of the beam 4 so that they may be angled in the usual way. The draft power, which may be either that of a tractor or of a team, is applied to the front frame and is transmitted to the rear unit in the manner hereinafter described.

Figure 3:
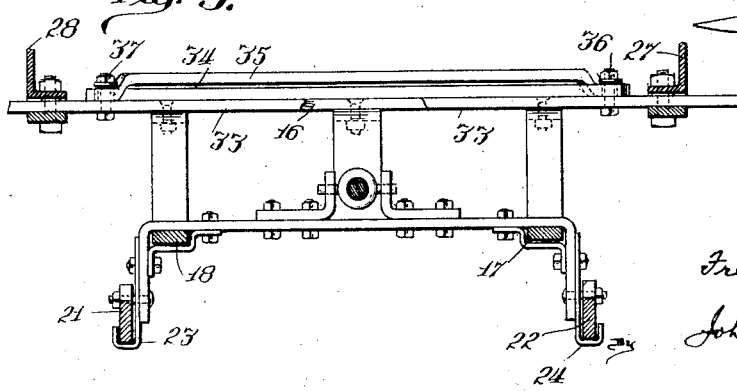
Fig. 3 is a vertical cross-section on line 3—3 of Fig. 1, looking to the rear.

The rear unit also comprises a transverse beam 9, similar to the beam 4, and disk gangs 10, 11 pivotally connected to the end portions of said beam at 12, 13. The frame of the rear unit also comprises a draft member composed of forwardly converging side members 14, 15, and a transverse member 16 by which said side members are connected together, these parts forming an approximately U-shaped frame through which the draft is applied to the rear unit in the manner hereinafter explained. The member 16 is connected with the beam 9 by bars 17, 18 that extend fore and aft and not only strengthen and stiffen the draft frame comprising the members 14, 15 and 16, but also serve as a support for a sliding plate 19 adjustable fore and aft to vary the angular relation to each other of the rear gangs. This plate is adjustable by means of a shaft 20 having a screw-threaded connection therewith in the manner set forth in my application above mentioned. The ends of the gangs 10, 11 are connected with said plate by links 21, 22, which preferably extend over stirrups 23, 24, best shown in Fig. 3. The gangs of the front unit are angled by means of links 25, 26 connected with the inner end portions of said gangs and adjustable fore and aft in any suitable way, as by the means disclosed in said application.

Extending rearwardly from the beam 4 at opposite sides of the median line of the harrow are draft bars 27, 28, the forward ends of which are connected to stirrups 29, 30, respectively, by horizontal pivots 31, 32, so that the rear ends of said draft bars may swing vertically. These connections are preferably loose enough so that the rear unit may swing to a slight extent about a longitudinal axis to enable the gangs of the rear unit to accommodate themselves to inequalities in the ground. Near their rear ends the draft bars 27, 28 are cross-connected by a cross-bar 33, so that they are held in parallelism with each other, and constitute a front draft frame.

Figure 2:
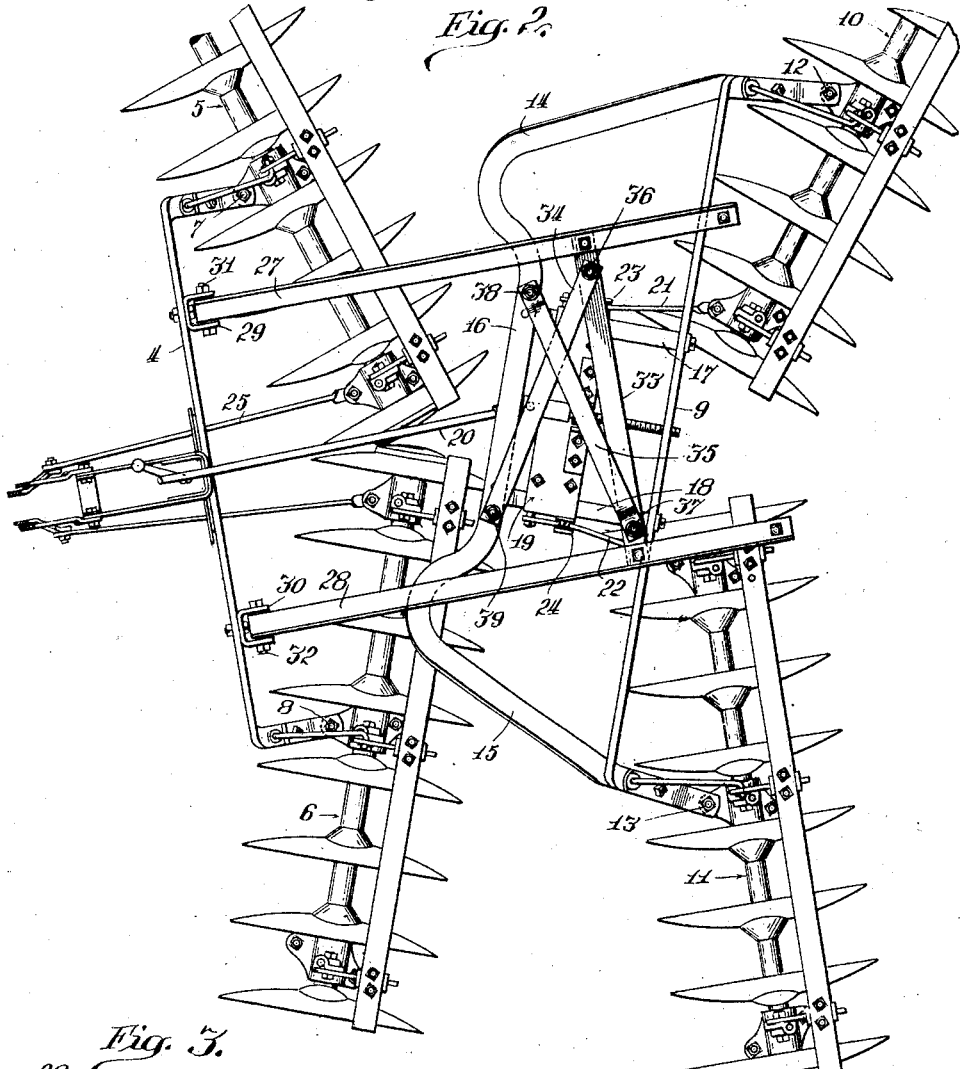
Fig. 2 is a similar view showing the parts when the harrow is being turned to the right.

The front and rear units are flexibly connected together so that their transverse axes may be angled relatively to each other by means of a pair of crossed links 34, 35, the rear ends of which are pivotally connected with the front draft frame, preferably by means of pivots 36, 37 extending through said links and through the end portions of the cross-bar 33. The forward ends of said links are similarly connected by pivots 38, 39, respectively, with the member 16 at opposite sides of the median line of the rear unit and at points equi-distant therefrom. Manifestly, draft power applied to the front unit will be transmitted by the cross-bar 33 to the rear ends of the links 34, 35, and through said links and the member 16 will be transmitted to the frame of the rear unit, so that the rear unit will be propelled by a pushing rather than by a pulling operation. The links 34, 35 are so arranged that when the harrow units are in their normal position, as for straight-away work, the crossing point of said links lies in the median line of the harrow, and preferably midway between the transverse axes of said units, by which arrangement the units are flexibly connected together in such manner that when they are swung to an angular position relatively to each other, as in turning the harrow in one direction or the other from a straight-ahead position, they will swing through concentric arcs, and the crossing point of said links, which represents the point of application of the draft to the rear unit, will be shifted inversely laterally or, in a direction opposite that in which the turn is being made, and the same is true if the front unit be held in its normal position while the rear unit is swung laterally owing to unequal resistance encountered by the rear gangs. As in making a turn, as well as when the rear section swings laterally, the center of load represented by the latter section shifts toward the outside of the curve, or away from the center of the turning arc determined by the point of intersection of the transverse axes of said units projected, it will be apparent that, by the arrangement described, under either of such conditions the point of application of the draft to the rear unit shifts in the same direction as the center of load, and consequently the draft operates effectively to restore the rear unit to its normal or straight-away position. This will be made clear by reference to Fig. 2, which illustrates the position of the harrow units when a turn to the left is being made, as well as the relative position of said units should the front unit be held in its normal position while the rear unit is swung relatively thereto owing to greater resistance encountered by the right-hand rear gang. As soon as the harrow units return to their normal position, the crossing point of said links is again brought into coincidence with the median line of the harrow and the line of draft coincides with the center of load. Any deviation of the front and rear units from their normal position therefore brings the force of the draft into play toward restoring said units to their normal position, and accordingly the draft force is always effective as a stabilizing factor and resists any tendency of the rear unit to swing laterally, or to side slip or drift on side hill work. In this connection it should also be noted that when the front unit is turned from a straight-away position the action of the links 34, 35 causes the rear unit to be moved up closer to the front unit. This relative forward movement of the rear unit of course requires the expenditure of draft force, owing to the resistance of the rear gangs, which gives them a tendency to lag, and consequently whenever the harrow is turned laterally in either direction, or the rear unit is angled relatively to the front unit, the resistance of the rear unit tends to restore both units to their straight-away position, and incidentally to swing the links 34, 35 so as to bring their crossing point into coincidence with the median line of the harrow, at which time the front and rear units are farthest apart. It will thus be seen that the force of the draft, together with the ground resistance of the rear unit, cooperate to restore the harrow units to their normal position whenever there is any deviation from such position. The harrow is therefore essentially stable, or not nervous. In this respect the crossed links above described function entirely differently from the way in which they would function if the draft were connected with the forward instead of with the rear ends of said links, and produce radically different results so far as maintaining stability and registration is concerned. It has heretofore been proposed to use crossed links having their forward ends connected to draft devices, and their rear ends to a trailing member, for the purpose of promoting registration by permitting the trailing member normally, or in the absence of adverse influences, to follow in the same curve as the member that it trails, but in all of such prior constructions the trailing member is exceedingly nervous and easily gets out of registration because the crossed links do not operate to shift the point of application of the draft to the rear member in the proper direction to maintain the stability of the trailing member or members, or, in other words, to cure nervousness,—on the contrary their operation is quite the opposite, since in those constructions the point of application of the draft to the trailing element shifts in the same direction as that in which such element swings or the front element is turned, i. e., toward the inside of the curve, and consequently the draft force applied to the trailing element tends to move it further away from, and to resist its return to, its normal straight-away relation to the front element, instead of to restore the trailing element to and maintain it in such position, as is the case with my improved construction. It will be seen, therefore, that the difference between pulling and pushing through the crossed links is a vital one, and produces opposite results as regards maintaining registration and overcoming nervousness.

In my improved construction the crossed links 34, 35 having their rear ends connected with the draft and their front ends connected with the rear unit, as above described, constitute means equivalent to the curved members shown and described in my aforesaid application for maintaining registration and overcoming nervousness, but they perform the added function of holding the units together when the harrow is backed, and avoid the necessity of making separate provision for doing that work.

The links 34, 35 should, of course, be so mounted that their crossing point is coincident with the median line of the harrow when the transverse axes of the units are parallel, but while I prefer to arrange said links 34, 35 so that such crossing point is always equidistant from such transverse axes, so that on turns said units tend to swing through concentric arcs, my invention is not restricted to that arrangement, as considerable deviation therefrom may be made without permitting the units to move transversely relatively to each other on turns to such an extent that the discs of the rear gangs do not work in the proper ridges.

So far as I am aware, I am the first in the art to use crossed links connected as described to shift the point of application of the draft to the rear unit of a disk harrow laterally away from the median line of such unit in the same direction as that in which the center of load shifts incident to relative angling of the units, and to an extent that may be said to be commensurate with or proportional to the angularity of the units. The use of crossed links for this purpose is therefore claimed generically herein, whether they be also arranged so as to permit the transverse axes of the units to swing through substantially concentric arcs or not, although the arrangement of the links so that they cross each other midway between such transverse axes is desirable, as in that way the best results are obtained.

What I claim as my invention and desire to secure by Letters Patent, is—

1. A tandem disk harrow comprising front and rear disk-carrying units, and draft connections flexibly connecting said units together to permit them to be angled relatively to each other, said draft connections being arranged to transmit the draft from the front unit to the rear unit and comprising means pivotally connected with the front and rear units and arranged to be actuated by relative angling thereof to shift the line of draft to the rear unit inversely laterally.

2. A tandem disk harrow comprising front and rear disk-carrying units, and draft connections flexibly connecting said units together to permit them to be angled relatively to each other, said draft connections being arranged to transmit the draft from the front unit to the rear unit and comprising means pivotally connected with the front and rear units and arranged to be actuated by relative angling thereof to shift the line of draft to the rear unit inversely laterally proportionately to the angularity of said units.

3. A tandem disk harrow comprising front and rear disk-carrying units, and draft connections flexibly connecting said units together to permit them to be angled relatively to each other, said draft connections being arranged to transmit the draft from the front unit to the rear unit and comprising crossed bars pivotally connected with the front and rear units and arranged to be actuated by relative angling thereof to shift the point of application of the draft to the rear unit inversely laterally.

4. A tandem disk harrow comprising front and rear disk-carrying units, and draft connections flexibly connecting said units together to permit them to be angled relatively to each other, said draft connections being arranged to transmit the draft from the front unit to the rear unit and comprising crossed bars pivotally connected with the front and rear units and arranged to be actuated by relative angling thereof to shift the point of application of the draft to the rear unit inversely laterally proportionately to the angularity of said units.

5. A tandem disk harrow comprising front and rear disk-carrying units, and draft connections flexibly connecting said units together to permit them to be angled relatively to each other, said draft connections being arranged to transmit the draft from the front unit to the rear unit and comprising crossed links having their rear ends connected with the front unit and their front ends with the rear unit and arranged to be actuated by relative angling of said units to shift the point of application of the draft to the rear unit laterally.

6. A tandem disk harrow comprising front and rear disk-carrying units, and draft connections flexibly connecting said units together, said draft connections being arranged to transmit the draft from the front unit to the rear unit and comprising crossed links having their rear ends connected with the front unit and their front ends connected with the rear unit, the crossing point of said links being normally coincident with the median line of the harrow.

7. A tandem disk harrow comprising front and rear disk-carrying units, and draft connections flexibly connecting said units together, said draft connections being arranged to transmit the draft from the front unit to the rear unit and comprising crossed links having their rear ends connected with the front unit and their front ends connected with the rear unit, the crossing point of said links being normally coincident with the median line of the harrow and approximately equi-distant from the transverse axes of said units.

8. A tandem disk harrow comprising front and rear disk-carrying units flexibly connected together, and means for transmitting draft power to said rear unit comprising crossed links having their rear ends connected with the draft means and their front ends pivotally connected with the rear unit, the crossing point of said links being arranged to be coincident with the median line of the harrow when said units are in their normal position.

9. A tandem disk harrow comprising front and rear disk carrying units flexibly connected together, and crossed links arranged to pushingly transmit draft power to the rear unit.

10. A tandem disk harrow comprising front and rear disk-carrying units flexibly connected together, and crossed links arranged to pushingly transmit draft power to the rear unit, the crossing point of said links being substantially coincident with the median line of the harrow when said units are in their normal position.

FREDERICK E. HAND.